(12) United States Patent
Castelli et al.

(10) Patent No.: US 6,535,872 B1
(45) Date of Patent: Mar. 18, 2003

(54) METHOD AND APPARATUS FOR DYNAMICALLY REPRESENTING AGGREGATED AND SEGMENTED DATA VIEWS USING VIEW ELEMENT SETS

(75) Inventors: Vittorio Castelli, White Plains, NY (US); Chung-Sheng Li, Ossining, NY (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/288,580

(22) Filed: Apr. 8, 1999

(51) Int. Cl.[7] .............................................. G06F 17/30
(52) U.S. Cl. .............................................. 707/3; 707/6
(58) Field of Search .......................... 707/2, 3, 4, 5–6, 707/100, 102, 205

(56) References Cited

U.S. PATENT DOCUMENTS

| | | | |
|---|---|---|---|
| 5,950,186 A | * | 9/1999 | Chaudhuri et al. ............. 707/2 |
| 5,960,423 A | * | 9/1999 | Chaudhuri et al. ............. 707/2 |
| 6,026,390 A | * | 2/2000 | Ross et al. ...................... 707/2 |
| 6,122,636 A | * | 9/2000 | Malloy et al. ................. 707/102 |
| 6,161,103 A | * | 12/2000 | Rauer et al. .................... 707/4 |
| 6,205,447 B1 | * | 3/2001 | Malloy ....................... 707/102 |

* cited by examiner

*Primary Examiner*—Diane D. Mizrahi
(74) *Attorney, Agent, or Firm*—Gail H. Zarick; Kevin M. Jordan; Anne Vachon Dougherty

(57) ABSTRACT

Apparatus and method for generating a view element representation of multiple-attribute tabular data are provided, including converting tabular data into a multidimensional lattice form whereby each functional attribute of the relational data is mapped to a dimension in the lattice, and each cell in the lattice corresponds to an aggregation over records in the data table. The mechanism further provides for generating a view element representation of multidimensional lattice data comprising decomposing the multidimensional data into view elements such that the view elements retain sufficient information to reconstruct the original lattice data. Alternatively, the mechanism for generating a view element data representation including iterative decomposition of the lattice data into aggregated and residual view elements or by spatially partitioning the lattice data. Further taught are an apparatus and a method for generating a view element data representation including the decomposition of the lattice data by iteratively and jointly aggregating and spatially partitioning the lattice data. Under the system for representing the data using view element sets, costs and benefits are assigned to the view elements and the view element sets are formed on the bases of the costs and benefits. A view of the data from a set of view elements is synthesized by selecting view elements from the view element sets and assembling the view elements together to construct the views.

15 Claims, 14 Drawing Sheets

| VIEW ELEMENT SET | BASIS | REDUNDANT | PROCESSING COST | STORAGE COST |
|---|---|---|---|---|
| $\{V_3, V_6, V_7\}$ | YES | NO | 3 | 4 |
| $\{V_1, V_5, V_6\}$ | YES | NO | 3 | 4 |
| $\{V_0\}$ | YES | NO | 4 | 4 |
| $\{V_1, V_4\}$ | YES | NO | 4 | 4 |
| $\{V_7, V_8\}$ | YES | NO | 4 | 4 |
| $\{V_2, V_3, V_5, V_6\}$ | YES | NO | 4 | 4 |
| $\{V_0, V_1, V_7\}$ | YES | YES | 0 | 8 |
| $\{V_1, V_7\}$ | NO | YES | 0 | 4 |
| $\{V_3, V_7\}$ | NO | NO | 3 | 3 |
| $\{V_2, V_3, V_5\}$ | NO | NO | 4 | 3 |

METHOD AND APPARATUS FOR DYNAMICALLY REPRESENTING AGGREGATED AND SEGMENTED DATA VIEWS USING VIEW ELEMENT SETS

FIELD OF THE INVENTION

The present invention relates to a method and apparatus for adaptively and dynamically representing multidimensional data using view element sets that can be used to construct aggregated and segmented views of the data.

BACKGROUND OF THE INVENTION

In applications involving online analytical processing (OLAP), image storage and retrieval (IS&T), geographic information systems (GIS) and video-on demand (VOD) systems, it is necessary to provide fast access to views of the data that involve various aggregations and segmentations of the data. To illustrate, an example aggregated and segmented view of a two-dimensional digital image corresponds to a spatial portion of a reduced-resolution version of the image. By pre-aggregating, partitioning and indexing the data accordingly, it is possible to provide more direct access to the data views of interest.

Data partitioning has been utilized in the context of database systems for the declustering and fragmentation of relational data tables to better allocate the data to sites in a communication network. In applications involving digital imagery, data partitioning in the form of quadtree segmentation has been used to split two-dimensional image data into spatial partitions, which can be stored separately or indexed as distinct units. By partitioning the data, views which comprise only portions of the full data set are more readily retrieved and assembled from the partitions.

Alternatively, the data views of interest may involve aggregations that compute averages from the data or that reduce the resolution of the data, such as thumbnail images providing reduced-resolution views of corresponding larger images. Data partitioning using filter banks has been used to split two-dimensional image data into spectral partitions, which correspond to aggregated and residual views of the images.

Aggregations of relational data involving combinations of multiple attributes can be represented using data cubes. The aggregated views of the data correspond to the cells of the data cube. By arranging the views in the data cube into a dependency hierarchy, it is possible to materialize, or pre-compute and store, only a subset of the views, and to compute additional views from the materialized views, as taught in H. Gupta, V. Harinarayan, A. Rajaraman and J. D. Ullman, Index Selection for OLAP," *Proc. of the 13th Int'l Conf. on Data Engineering*, 1997.

In the past, multiple-resolution views of images have been organized into redundant and non-redundant pyramidal forms to allow reduced-resolution views of the data to be accessed. The multidimensional data can be jointly aggregated and spatially partitioned. Data decompositions involving segmentation and aggregation of multidimensional lattice data have been developed in the Double-tree (see: C. Herley, J. Kovacevic, K. Ramchandran, and M. Vetterli, "Tilings of the Time-Frequency Plane: Constructions of Arbitrary Orthogonal Bases and Fast Tiling Algorithms, " *IEEE Trans. on Image Processing*, December, 1993), Dual Double-tree (see: J. R. Smith and S. -F. Chang, "Frequency and Spatially Adaptive Wavelet Packets," *Proc. IEEE ICASSP*, May, 1995), JASF Graph, and Space-Frequency Tree (see: J. R. Smith and S. -F. Chang, "Joint Adaptive Space and Frequency Graph Basis Selection," *Proc. IEEE ICIP*, October 1997).

There can be benefit to making a good selection of which view elements to materialize in terms of storage space and view retrieval time. The selection of redundant views in a dependency hierarchy has been used for the pre-materialization of views in data cubes. A tree-based selection process has been utilized for selecting non-redundant wavelet packet bases for representing one-dimensional and two-dimensional digital signals. The process was extended to a graph that combines spatial segmentation and frequency decomposition for representing two-dimensional images.

In accordance with the aforementioned needs, it is an objective of the present invention to provide an apparatus and method for: generating representations of multidimensional data using view element sets, for adaptively and dynamically selecting representative view element sets according to patterns of view access, storage constraints and processing costs, and for assembling or synthesizing views of the data from view element sets.

It is another objective to provide a system and method having features for selecting and materializing view element sets according to storage costs and constraints, processing costs, and frequencies of view access by users.

Yet another objective is to provide a system and method having features for dynamically reconfiguring the data representation in accordance with the foregoing constraints and for adapting to emerging patterns of view access.

SUMMARY OF THE INVENTION

These and other objectives are realized by the present invention wherein an apparatus and method for generating a view element representation of multiple-attribute tabular data are provided, including converting tabular data into a multidimensional lattice form whereby each functional attribute of the relational data is mapped to a dimension in the lattice, and each cell in the lattice corresponds to an aggregation over records in the data table.

The invention further provides an apparatus and method for generating a view element representation of multidimensional lattice data comprising decomposing the multidimensional data into view elements such that the view elements retain sufficient information to reconstruct the original lattice data.

Alternatively, the invention provides for generating a view element data representation including iterative decomposition of the lattice data into aggregated and residual view elements or by spatially partitioning the lattice data.

Further taught are an apparatus and method for generating a view element data representation including the decomposition of the lattice data by iteratively and jointly aggregating and spatially partitioning the lattice data.

Under the inventive system for representing the data using view element sets, costs and benefits are assigned to the view elements and the view element sets are formed on the bases of the costs and benefits. A view of the data from a set of view elements is synthesized by selecting view elements from the view element sets and assembling the view elements together to construct the views.

BRIEF DESCRIPTION OF THE DRAWINGS

The invention will now be described in greater detail with specific reference to the appended drawings wherein.

DETAILED DESCRIPTION OF THE PREFERRED EMBODIMENT

Figure 1:
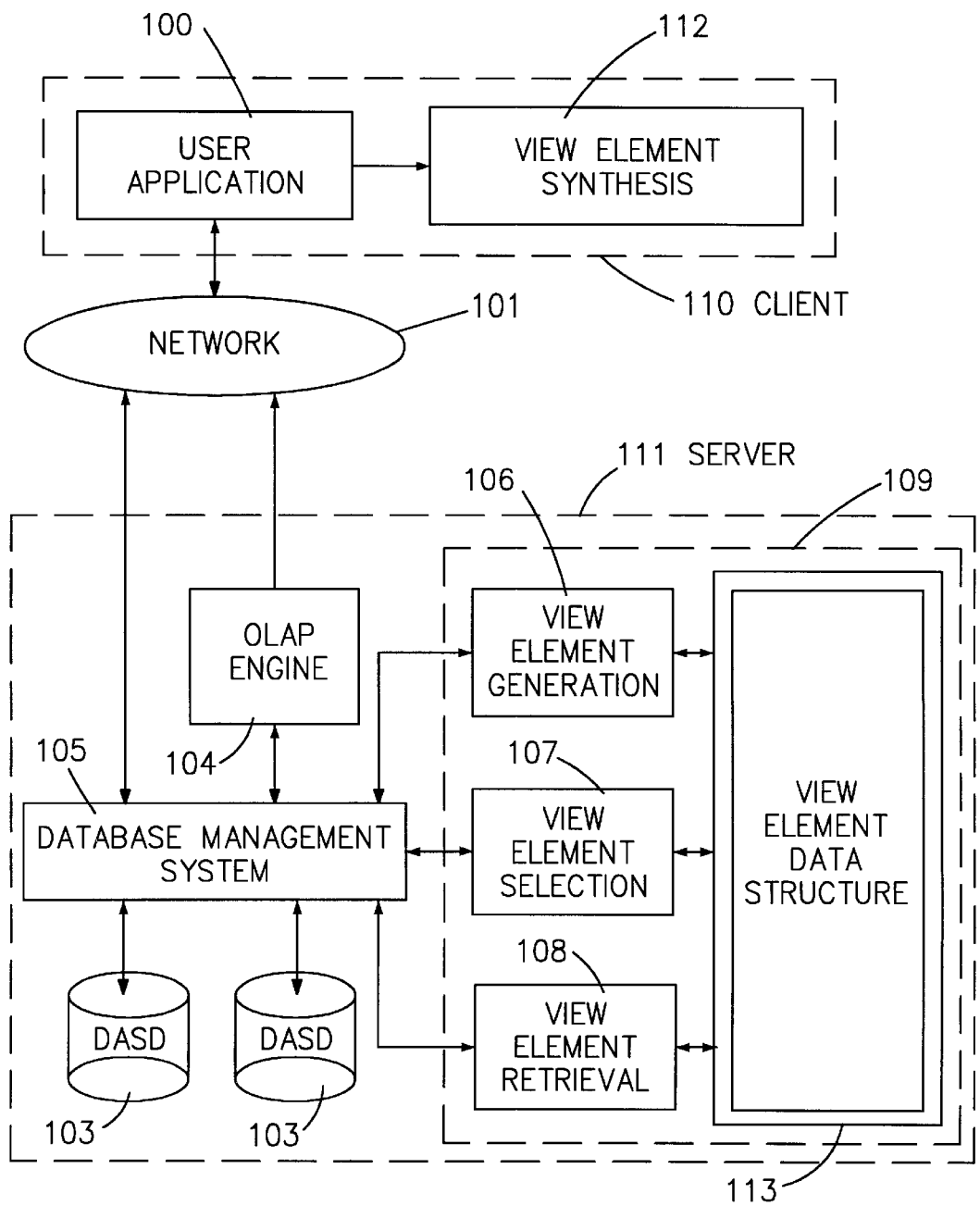
FIG. 1 depicts a client-server system in accordance with the present invention.

FIG. 1 depicts a networked client/server system having features of the present invention. As depicted, a client, 110, and server, 111, are interconnected by a network, 101. A server, 111, includes a conventional database management system (DBMS), 102, and direct access storage devices (DASD), 103A . . . 103x. Through a user application, 100, the user issues queries to be processed at a server, 111. A query is typically prepared on a client machine, 110, and is submitted to the server, 111, through the network, 101. A query typically interacts with the database management system, 102, for retrieving or updating the data stored in an associated DASD, 103A. For example, an on-line analytical processing (OLAP) engine, 104, may receive queries involving aggregated views of the data in the DBMS, 102. Those queries involving aggregated views of the data stored at the server will invoke the view management subsystem, 109. A view element retrieval engine, 108 in sub-system 109, is responsible for accessing the view elements required to retrieve the view requested in the query.

The data in the DBMS is decomposed into view elements by the view element generation engine, 106. The generation of view elements may involve the conversion of relational or tabular data to a multidimensional lattice form through the application of an aggregation operator, which is described in more detail with reference to FIG. 2. The view element generation engine, 106, generates a view element hierarchy data structure by aggregating or segmenting the lattice data. The view element selection engine, 107, selects an advantageous set of view elements from the indexed hierarchy, to be stored by the DBMS, 102, in a DASD, 103A. In response to a client query, the view retrieval engine, 108, retrieves the appropriate view elements from the DBMS, 102, and synthesizes the view. The synthesized view is then returned to the client via the DBMS, 102, and OLAP engine, 104. Alternative to the synthesis of the views at the server, 111, view elements can be returned directly to the client, 110, in order for the client to synthesize the views directly. In this case, the view synthesis which was just described is performed at the client location.

The view management subsystem, 109, keeps a log of the views that are requested by the DBMS, 102, in order to periodically reconfigure the view element sets that are stored by the DBMS, 102. For example, the frequency with which certain views are requested can be used by the view element selection engine, 106, as the criterion for selecting view elements that are advantageous for efficiently synthesizing and retrieving frequently accessed views.

Figure 2:
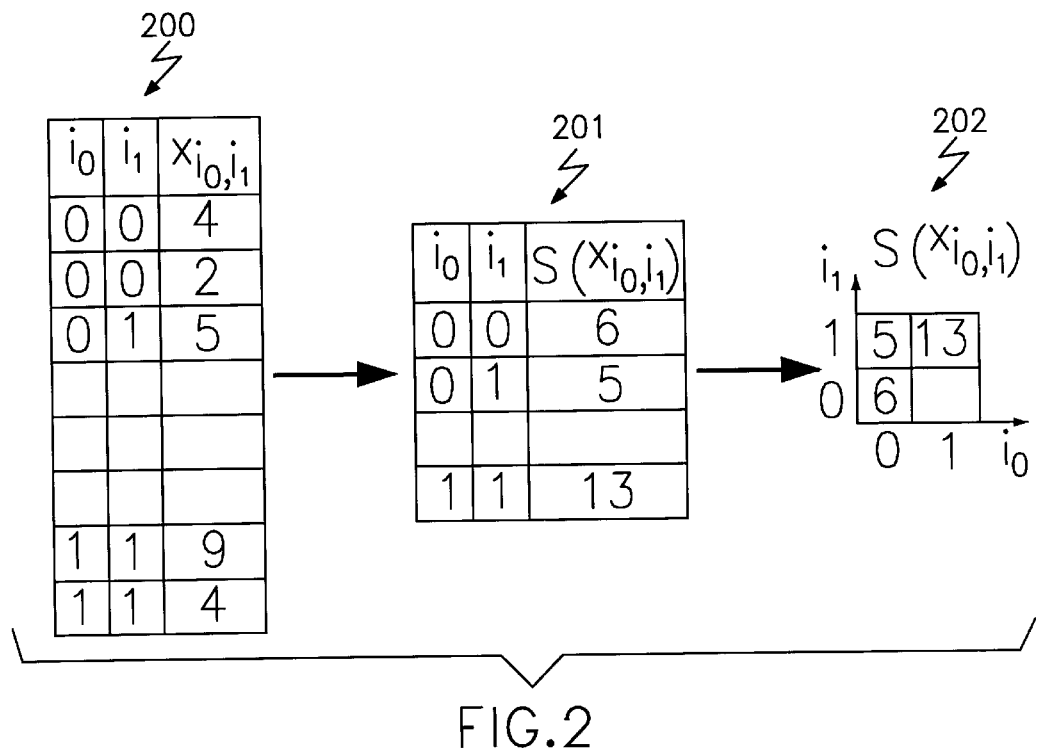
FIG. 2 depicts an example of a conversion of multiple attribute tabular data to multidimensional lattice data in accordance with the present invention.

FIG. 2 depicts an example of a conversion of multiple attribute tabular data to multidimensional lattice data (illustratively provided for multidimensional OLAP). In general, this data preparation converts any structured data into a non-structured lattice form. In order to handle view queries of relational and tabular data, the view management subsystem converts the tabular data, 200, to a multidimensional lattice form, 202. For example, FIG. 2 illustrates a data table, 200, with two-attributes (i and one summary attribute x. A data cube table, 201, is generated by aggregating those records with like attributes (i. The aggregation operator S combines the records and generates an aggregated summary attributeS(x. The aggregated summary attribute may be generated by the sum, mean, min, max, count or other operation on the like records. In a relational database system, the data cube table, 201, may be generated by the SQL CUBE operator.

The view management subsystem converts the data cube table, 201, into a multidimensional lattice form, 202, by representing each record in the data cube table, 201, by a cell in a multidimensional lattice whose lattice position corresponds directly to the attributes of the record in the data cube table, 201. The value of the cell in the multidimensional lattice, 202, is determined from the value of the aggregated summary value in the data cube table, 201.

Figures 3A, 3B:
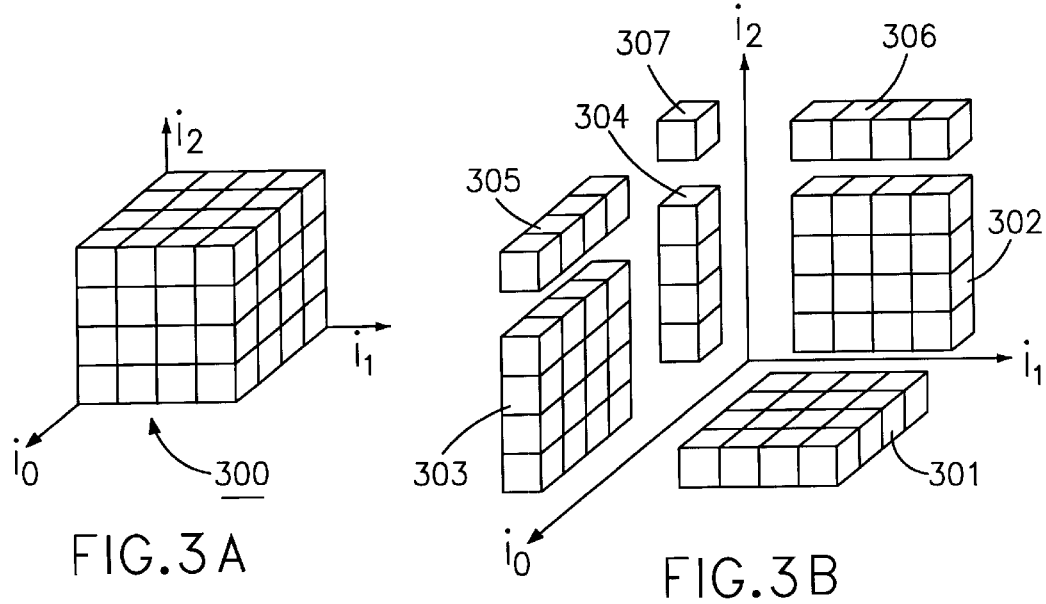
FIGS. 3A and 3B illustrate a representative three-dimensional data cube.

FIGS. 3A and 3B illustrate a representative three-dimensional data cube. The three-dimensional lattice is depicted at 300 in FIG. 3A while the aggregated views of the lattice data are provided as 301–307 in FIG. 3B. Each aggregated view is generated by aggregating the lattice data over some of its dimensions (i.e., $i_0$ and i). For example, the aggregated view given by 302 is generated by aggregating the lattice data 300 on dimension $i_0$. Likewise, the aggregated view given by 304 is generated by aggregating the lattice data 300 on dimensions $i_0$ and i.

Figure 4:
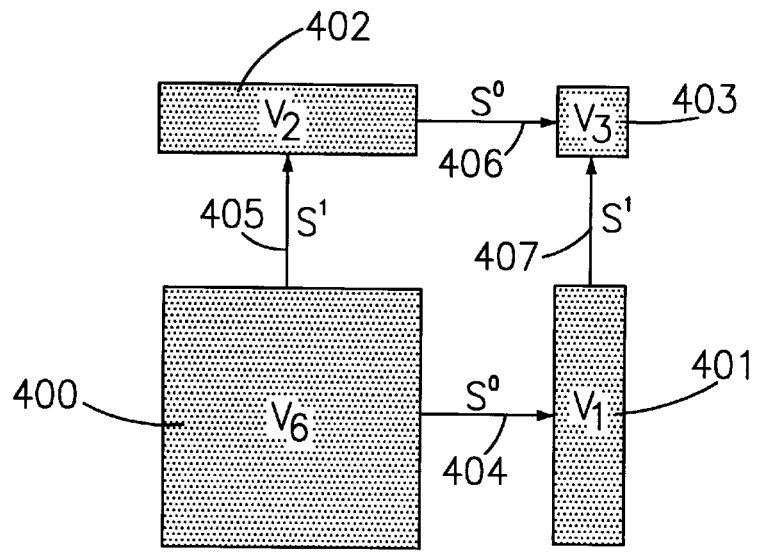
FIG. 4 depicts a two-dimensional view hierarchy.

FIG. 4 depicts a two-dimensional view hierarchy. Each block ($V_1$, $V_2$, $V_3$), 401–403, is an aggregated view of the two-dimensional lattice data $V_0$, 400. The view hierarchy illustrates the dependency among views, i.e., ($V_0$ $V_1$, $V_0$ $V_2$, $V_1$ $V_3$, $V_2$ $V_3$). For example, $V_1$, 401, is generated from $V_0$, 400, by aggregating $V_0$ along dimension $i_0$. The view $V_2$, 402, is generated from $V_0$, 400, by aggregating $V_1$, 401, along dimension $i_1$. Examples of aggregation operators include, but are not limited to, max, min, mean, sum, count, median and variance.

Figure 5:
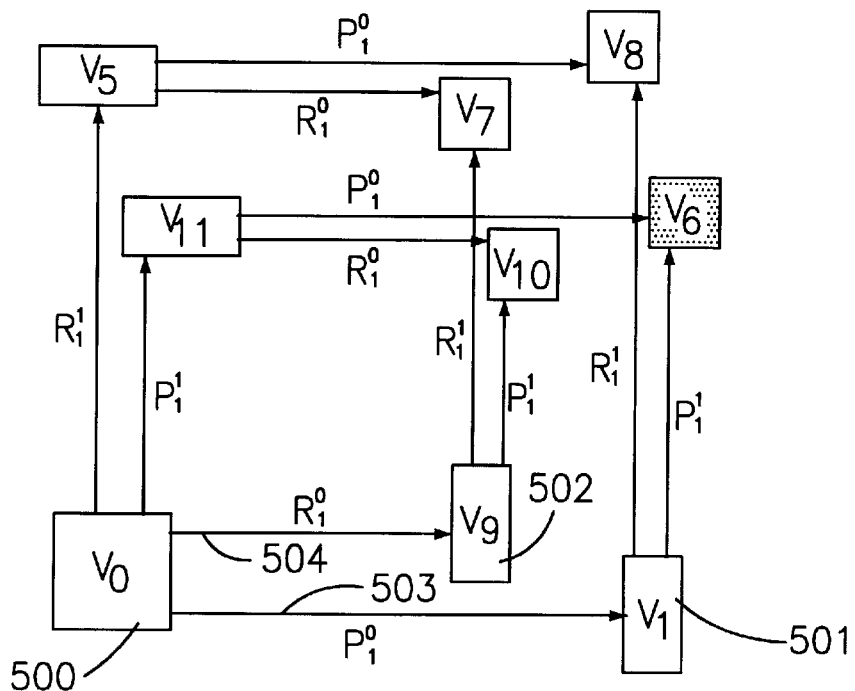
FIG. 5 illustrates the view element hierarchy with partially aggregated and residual view elements.

FIG. 5 illustrates the view element hierarchy with partially aggregated and residual view elements. The operators $P_1$ and $R_1$ form a partial and residual aggregation operator pair which satisfy the properties of perfect reconstruction, non-expansiveness, distributivity and separability. The complete decomposition of each parent view element along a dimension generates one partial- and one-residual child view element, which can be combined to resynthesize the parent view element. For example, the partial aggregation $P_1$, 503, on dimension i of view element $V_0$, 500, generates the view element $V_0$, 501. The residual aggregation $R_1$, 504, on dimension i of view element $V_0$, 500, generates the view element $V_9$, 502. These view elements can be combined to resynthesize the parent view element $V_0$, 500.

Figure 6:
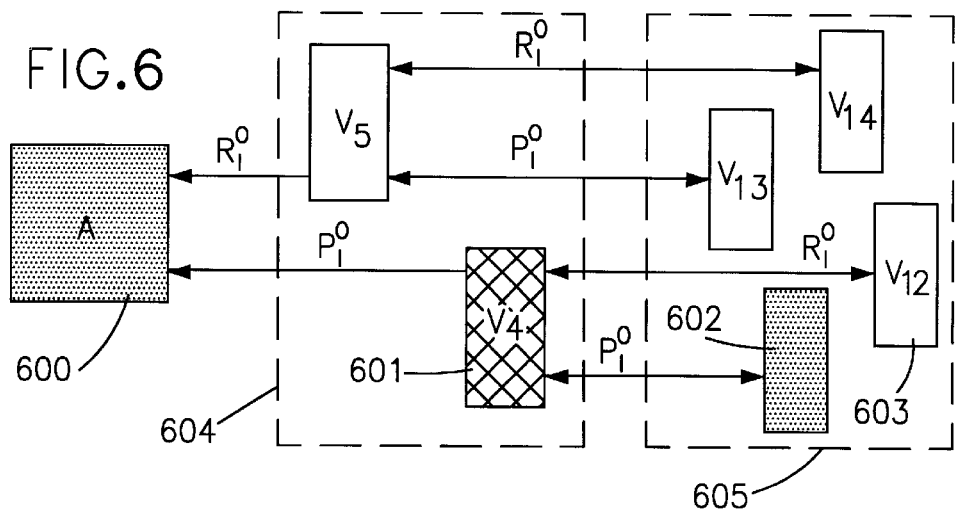
FIG. 6 illustrates a representative view element hierarchy with aggregated views and intermediate and residual view elements

FIG. 6 illustrates a representative view element hierarchy with aggregated views and intermediate and residual view elements. Aggregated views of the data can be computed by cascading the partial aggregation operators $P_1$. For example, the aggregated view $V_1$, 602 along dimension i of $V_0$, 600 is generated by cascading $P_1$ twice, first to generate view element $V_4$, 601, then to generate $V_1$. Together, the partial and residual aggregation operators can be cascaded to iteratively decompose the data, into the hierarchy of view element.

The data cube can be decomposed into view elements using partial and residual aggregation operators based on the Haar transformation as follows: define the first partial sum operator pair $(P_1^m, R_1^m)$ for a dimension $i_m$ of A as follows:

$P_1^m(A) = \Sigma_{1=0} A[i_0, \ldots, 2i_m+1, \ldots, i_{d+1}]$ and $R_1^m(A) = \Sigma_{1=0}(-1)^1 A[i_0, \ldots, 2i_m+1, \ldots, i_{d+1}]$ The operator pair $(P_1^m, R_1^m)$ are a multidimensional extension of the discrete-time Haar filter bank. Denote by $P_1^m(A)$, the first partial aggregation and by $R_1^m(A)$, the first partial residual. It can be seen that $P_1^m(A)$ takes the sums of neighboring pairs of points along each dimension of A, and subsamples by two. $R_1^m$ simply takes the differences and subsamples by two. The pair $(P_1^m, R_1^m)$ satisfies the perfect reconstruction property since A can be perfectly reconstructed from $P_1^m(A)$ and $R_1^m(A)$. The perfect reconstruction of A is achieved from:

$$A[i_0, \ldots, 2i_m, \ldots, i_{d-1}] = \frac{1}{2}(P_1^m(A) + R_1^m(A))$$

end $$A[i_0, \ldots, 2i_m+1, \ldots, i_{d-1}] = \frac{1}{2}(P_1^m(A) - R_1^m(A)).$$

In order to generalize the operators, define $P_0^m(A) = R_0^m(A) = A$. Then, the following recursive expression for computes the partial and residual aggregations, where for denote $P_k^{m-1}(A)$ and $R_{-1}^m(A)$ by $P_{k-1}^m$ and $R_{k-1}^m$, respectively, $P_k^m(P_{k-1}^m) = \Sigma_{1=0} P_{k-1}^m[i_0, \ldots, 2i_m+1, \ldots, i_{d+1}]$ $R_k^m(P_{k-1}^m) = \Sigma_{1=0}(-1)^1 P_{k-1}^m[i_0, \ldots, 2i_m+1, \ldots, i_{d+1}]$ The distributivity of $P_k^m$ and $R_k^m$ enable the first partial aggregation operators to be cascaded along a dimension of A to generate the k-th partial aggregation. $P_k^m(A)$ can be computed by applying $P_1^m$ recursively to $P_0(A)$. The k-th partial aggregations are derived recursively from $P_k^m(A) = P_1^m(P_{k-1}^m(A))$ and $R_{km}(A) = R_1^m(P_{k-1}^m(A))$. This gives $P_1^m$ and $R_{1m}$ the telescopic properties, $$P_k^m(A) = \underline{P_1^m(P_1^m( \cdots (P_{1_k}^m(A))))},$$

in which $P_k^m(A)$ is computed progressively. The distributivity allows the generalization of the property of perfect reconstruction to the k-th partial aggregation as follows:

$$P_{k-1}^m[i_0, \ldots, 2i_m, \ldots, i_{d-1}] = \frac{1}{2}(P_k^m(A) + R_k^m(A))$$

and $$P_{k-1}^m[i_0, \ldots, 2i_m+1, \ldots, i_{d-1}] = \frac{1}{2}(P_k^m(A) - R_k^m(A)).$$

The pair $(P_1^m, R_1^m)$ is also non-expansive. This property is important in generating decompositions of the data cube that do not expand the volume of the data cube. The non-expansion property is illustrated as follows: consider a data cube A of with volume given by $Vol(A) = \Pi_{m=0}^{d-1} n_m$. Then, the volume of the partial aggregation child $Vol(P_1^m(A))$ is given by $$Vol(P_1^m(A)) = n_0 n_1 \ldots \frac{n_m}{2} \ldots n_{d-1},$$

and the same for $R_1^m(A)$. It follows that
$Vol(P_1^m(A)) + Vol(R_1^m(A)) = Vol(A)$.
Furthermore, $P_1^m$ and $R_1^m$ are separable since they operate solely on dimension $i_m$ of the input. The separability and distributivity of $P_1^m$ and $R_1^m$ enable the input to be aggregated along multiple dimensions by cascading the aggregation operators in any order as follows:

$P_{1,1}^{m,n}(A) = P_1^m(P_1^n(A)) = P_1^n(P_1^m(A))$.

The total aggregation along a dimension $i_m$ is computed by cascading $P_1^m$ in succession $\log_2 n_m$ times, where $n_m$ is the size of dimension $i_m$. For example, the total sum $S^m(A)$ of A along dimension $i_m$ is given by $$S^m(A) = P_{\log_2 n_m}^m(A) = \underline{P_1^m(P_1^m( \cdots (P_{1_{\log_2 n_m}}^m (A))))}.$$

This is generalized to compute the total sum of A as follows:

$$S(A) = \underline{S^0(S^1( \cdots (S^{d-1}_d(A))))} = P_{\log_2 n_0}^0 \left( P_{\log_2 n_1}^1 \left( \cdots \left( P_{\log_2 n_{d-1}}^{d-1}(A) \right) \right) \right).$$

Figure 7:
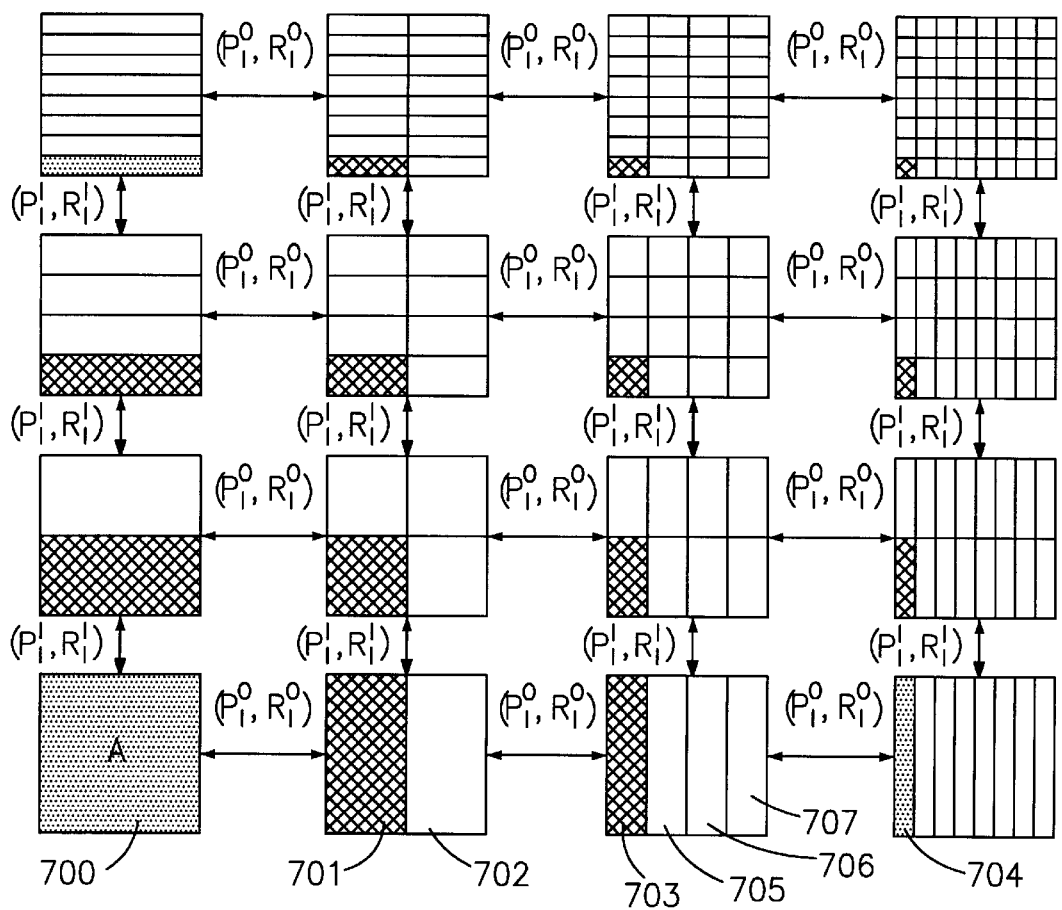
FIG. 7 illustrates the organization of the view elements generated by the partial and residual aggregation operators into a view element dependency graph.

FIG. 7 illustrates the organization of the view elements generated by the partial and residual aggregation operators into a view element dependency graph. The view element dependency graph determines which view elements and aggregation and synthesis operations are required for generation of an aggregated view. The view element graph is a superstructure of the view dependency hierarchy in FIG. 4.

Figure 8A:
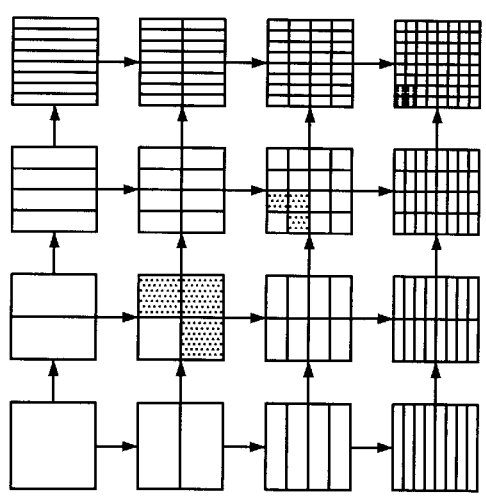
FIGS. 8A–8D illustrate a variety of view element sets selected from the view element graph.
Figure 8B:
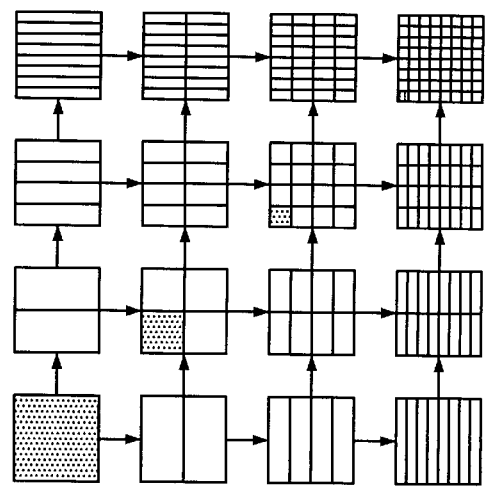
Figure 8C:
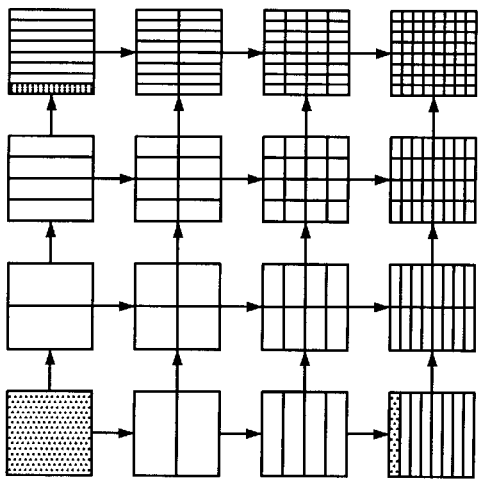
Figure 8D:
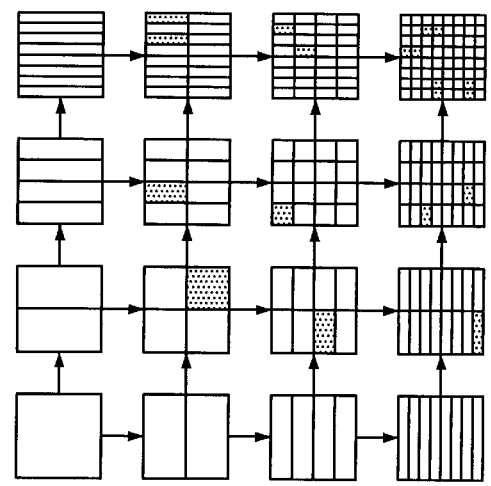

FIGS. 8A–8D illustrate a variety of view element sets selected from the view element graph. FIG. 8A depicts a two-dimensional wavelet basis view element set. FIG. 8B illustrates a two-dimensional Gaussian pyramid view element set. FIG. 8C illustrates a two-dimensional aggregated view hierarchy set. FIG. 8D depicts an example wavelet packet basis view element set.

Figure 9:
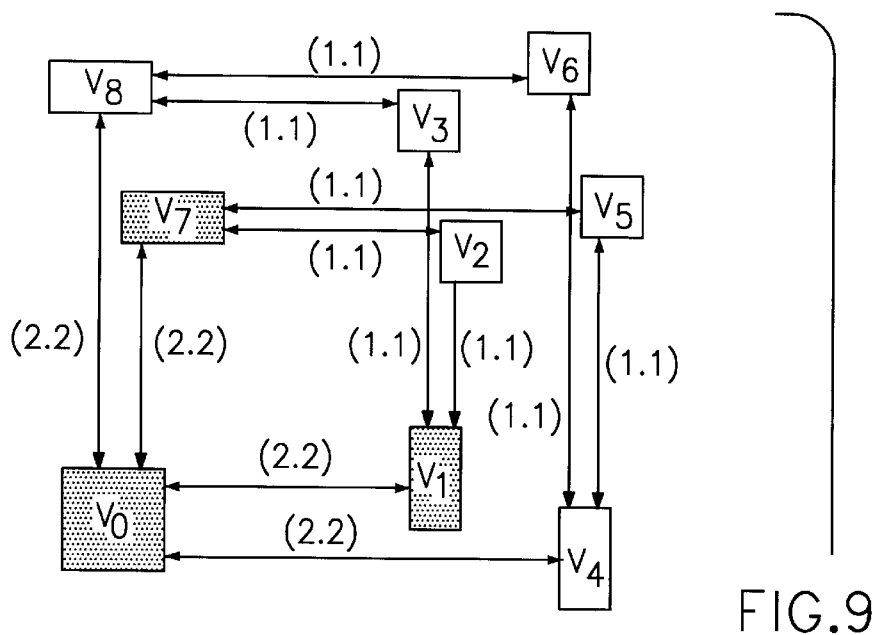
FIG. 9 illustrates an example of the selection of view element sets on the basis of processing cost and frequency of view accesses.

FIG. 9 illustrates an example of the selection of view element sets on the basis of processing cost and frequency of view accesses. In this example, two of the views: $V_1$, and $V_7$ are each accessed with relative frequency of 0.5. The processing costs for aggregating and synthesizing the view elements are indicated by (i in FIG. 9, where x is the aggregation cost and y is the synthesis cost. The aggregation and synthesis costs indicate the computation required in order to perform the corresponding transitions in the view element graph.

The table shows a comparison of several candidate view element sets in terms of their relative storage and processing costs. For example, the view element set $\{V_1, V_5, V_6\}$ forms a complete basis for $V_0$ and since it is non-redundant, has a storage cost of 4. In this example, the storage costs correspond to the volume of the data in the view element sets. The view element set $\{V_1, V_5, V_6\}$ is capable of generating the patterns of views with a total processing cost of 3.

The discussion above has been focused on generating view element sets based on uniform frequency or spatial decompositions. In general, non-uniform decomposition is possible to adapt to the natural boundaries of the data. This can be important for OLAP applications in which ranges along each dimension correspond to semantically meaningful categories.

Figure 10:
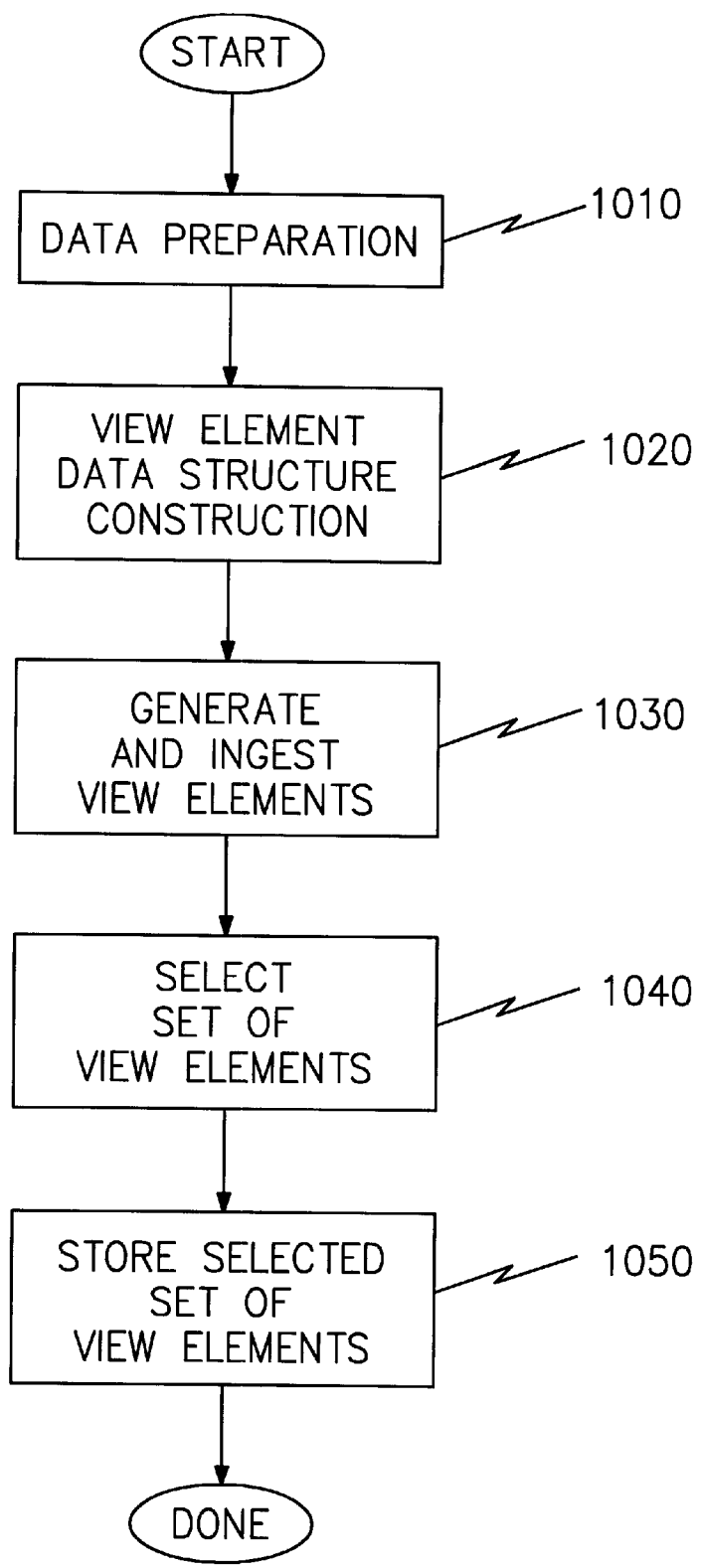
FIG. 10 provides a flow diagram which is suitable for implementing the view element generation process.

Referring to FIG. 10, there is shown a flow diagram which is suitable for implementing the view element generation process. The process generates the view element representation given an input data. The block 1010 represents the preparing of the data by converting it to a multidimensional lattice-form. The example of FIG. 2 illustrates one example of the conversion of a relational table to a lattice-form in order to prepare the data. The block 1020 represents the routine for constructing a view element data structure such as those illustrated in FIGS. 4–7. Other examples of view element data structures include filter banks, wavelet packet trees, spatial quad-trees, and the space and frequency graph. The block 1020 does not require that the view element data structure needs to be constructed explicitly after the data preparation block 1010. It is possible that a view element data structure can be constructed once and reused to handle new data.

In general, the view element data structure consists of node elements that contain the data and meta-data related to each view element. The view element data structure also consists of transition elements that connect the node elements and indicate the processing steps required for the data in a source node element to be used to contribute to the formation of the data in a destination node element.

The block 1030 represents the routine for generating the view elements from the prepared data and the ingesting of the data into the view element data structure. There are various ways in which the view elements may be generated, the routine of FIG. 12 describing an implementation of the present embodiment. The block 1040 represents the routine for selecting a set of view elements from the view element data structure for representing the data. There are various ways in which the view elements may be selected, the routine of FIG. 15 describing an implementation of the present embodiment. The block 1050 represents the routine for storing the selected view elements.

Figure 11:
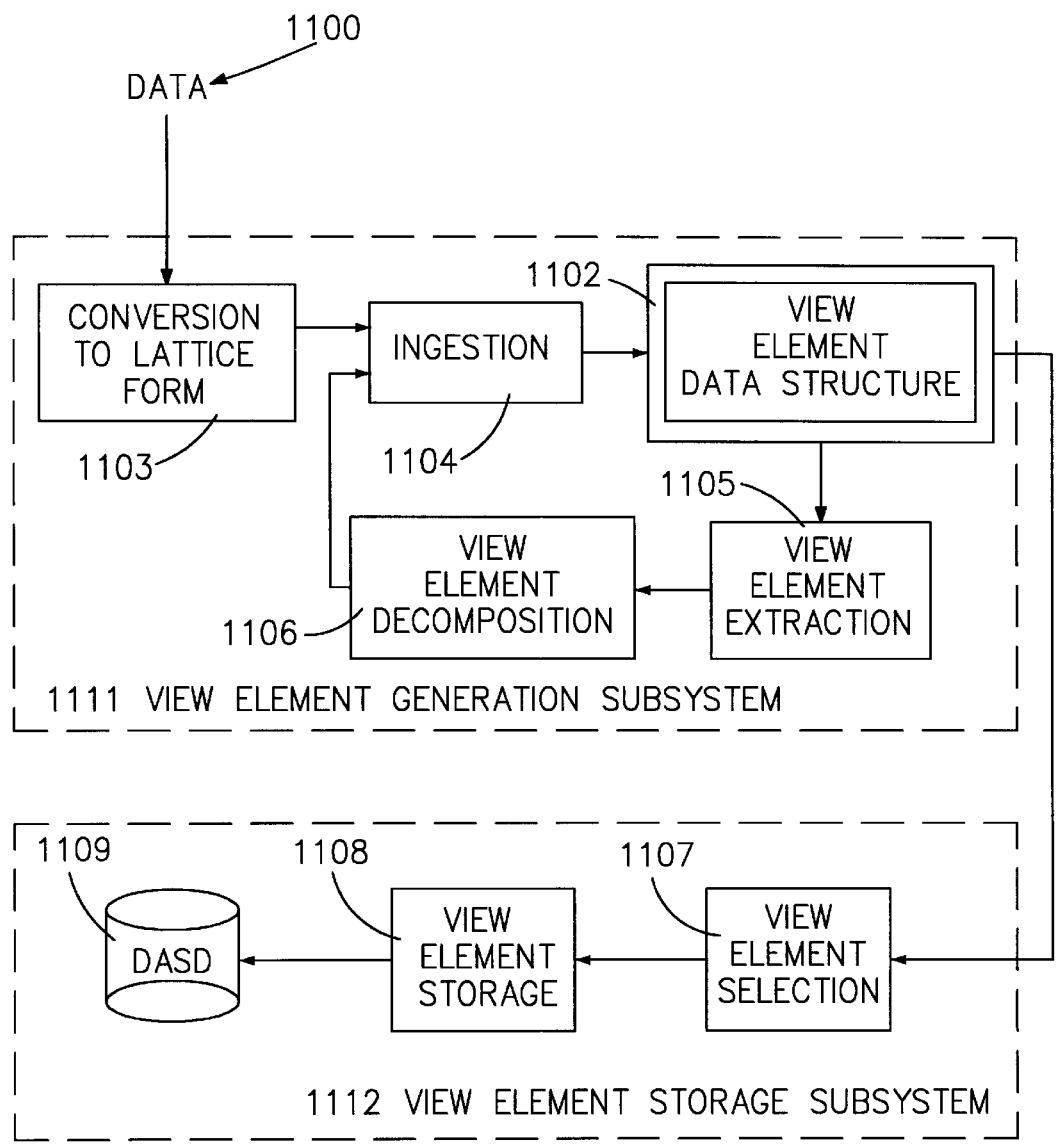
FIG. 11 illustrates a block diagram of an apparatus for generating, selecting and storing a view element representation.

FIG. 11 illustrates a block diagram of an apparatus for generating, selecting and storing a view element representation. The data 1100 is input into the view element generation subsystem 1111 and converted to lattice form in step 1103. The lattice data is ingested in step 1104 into the view element data structure 1102 and is represented in the form of a view element, or multiple view elements. The view elements are then extracted in step 1105 from the view element data structure 1102 and are processed or decomposed in step 1106. The product data of step 1106 is then ingested in step 104 into the view element data structure. The process is repeated until the view element data structure is fully populated such that all node elements contain data. It is possible to stop the ingestion process without fully populating the view element data structure. In the view element selection step 1107, a set of view elements is selected and extracted from the view element data structure 1102 and is stored in step 1108 into the DASD 1109.

Figure 12:
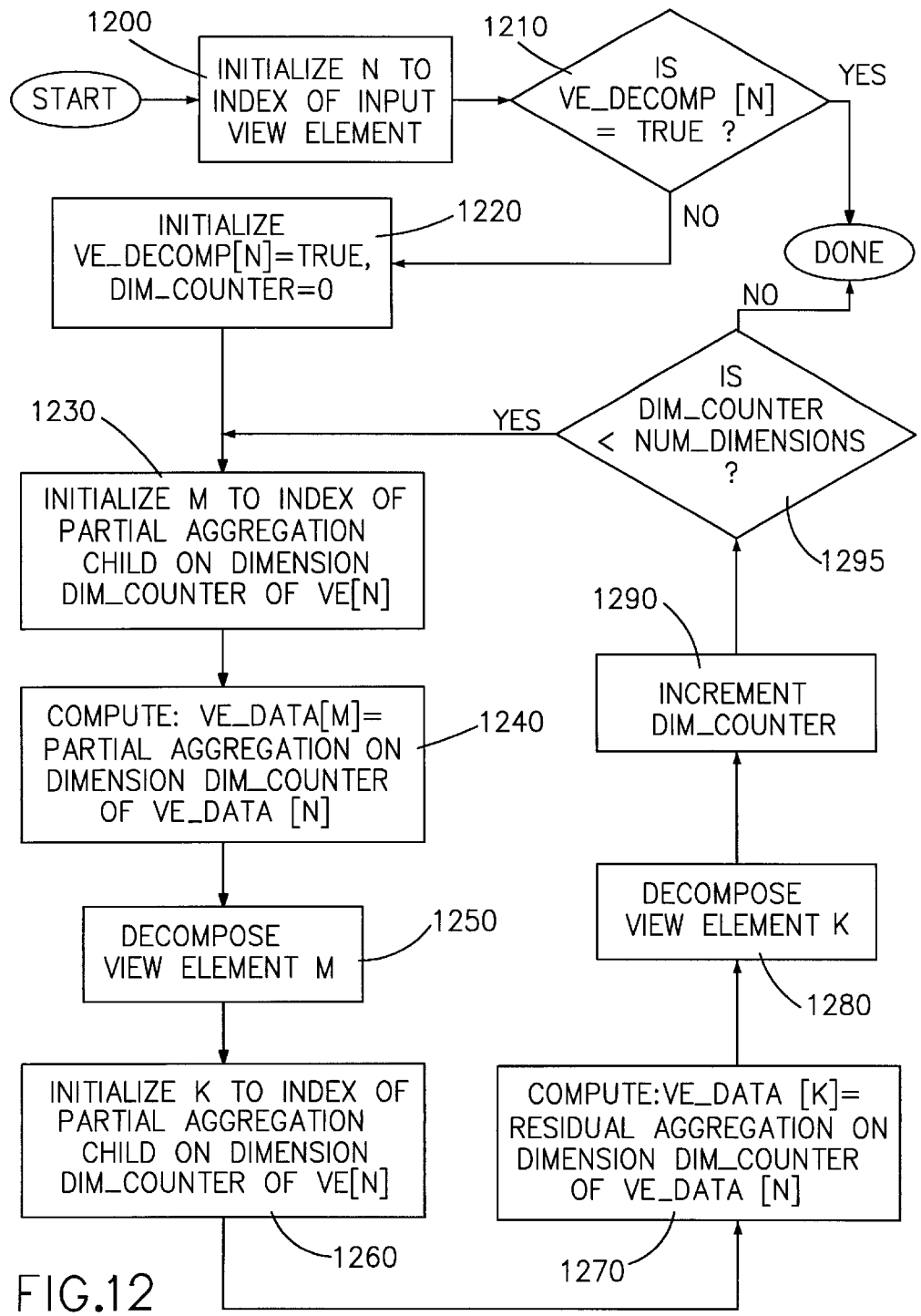
FIG. 12 provides a flow diagram for implementing the process by which the view elements are generated by iteratively decomposing the prepared input data.

Referring to FIG. 12, there is shown a flow diagram for implementing the process by which the view elements are generated by iteratively decomposing the prepared input data. The routine operates on the data stored in a view element that is input into the routine. The block 1200 represents the initializing of node index N to the index of the input view element. Inquiry is then made (diamond 1210) as to whether the input view element has previously been input into this routine. If so, then the routine is completed. If not, then the view element data is decomposed as follows: the block 1220 represents the initializing of the dimension counter for the input view element to zero. The block 1220 also represents the setting of the flag that marks that the input view element has been input into this routine.

The block 1230 represents the initializing of a node index M to the index value of the partial aggregation child view element on the dimension of the view element indicated by the dimension counter. FIG. 5 illustrates an example of a parent view element, 500, and a partial aggregation child view element, 501, that is generated by partially aggregating the parent view element along one dimension by a decomposition operator 503. The block 1240 represents the computing of the data that belongs to the view element with node index M by processing the data in the view element with node index N. Block 1250 represents the iterating of the view element generation routine on the view element with node index M. That is, the view element with node index M is passed back into this routine and a new view element generation process is carried out starting with block 1200. After completing the block 1250, the decomposition process is carried out on the residual aggregation child on the dimension indicated by the dimension counter starting with block 1260.

The block 1260 represents the initializing of a node index K to the index value of the residual aggregation child view element on the dimension of the view element indicated by the dimension counter. FIG. 5 illustrates an example of a parent view element, 500, and a residual aggregation child view element, 502, that is generated by the partial residual aggregation of the parent view element along one dimension by a decomposition operator 504. The block 1270 represents the computing of the data that belongs to the view element with node index K by processing the data in the view element with node index N. Block 1280 represents the iterating of the view element generation routine on the view element with node index K. That is, the view element with node index K is passed back into this routine and a new view element generation process is carried out starting with block 1200. After completing the block 1280, the decomposition processes are repeated for the next dimension of the view element with node index N.

Block 1290 represents the incrementing of the dimension counter. Inquiry is then made (diamond 1295) as to whether the all of the dimensions of the data in the view element with node index value N have been decomposed. The test is carried out by comparing the dimension counter to the number of dimensions of the data. If the dimension counter is less then the number of dimensions of the data, then the flow is directed back towards block 1230 to repeat the decomposition process on the next dimension of the data. If not, then the routine is completed.

Figure 13:
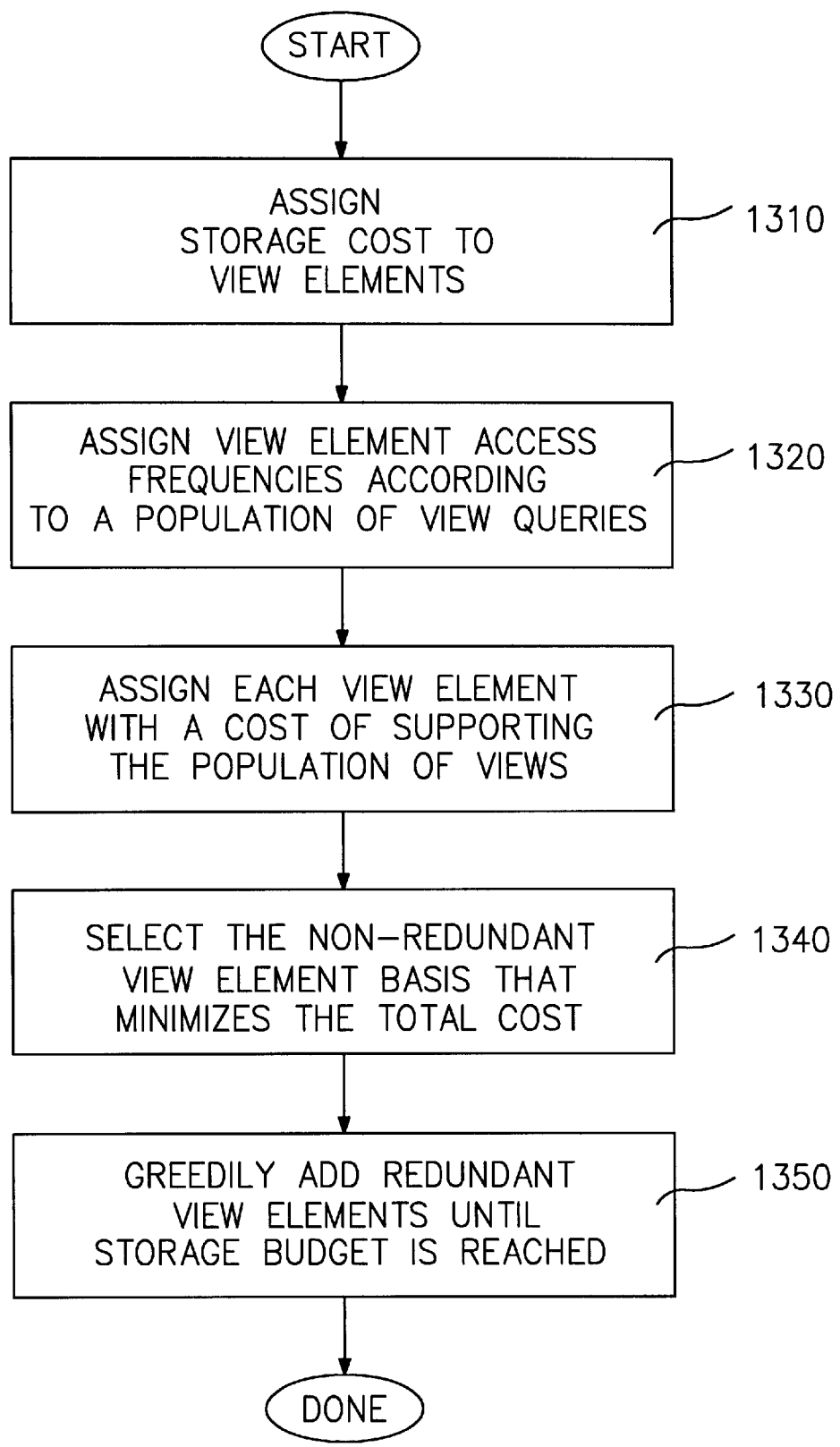
FIG. 13 shows a flow diagram that is suitable for implementing the view element selection process.

Referring to FIG. 13, there is shown a flow diagram that is suitable for implementing the view element selection process. The process selects a set of view elements on the basis of the storage costs and the processing costs for accessing a population of view queries. The block 1310 represents the assigning of storage costs to the view elements in the view element data structure. The storage cost can be derived from the volume of the data stored in the view element. Other factors can be used to weight the storage costs that depend on the location, medium and compression used for storing the view element. The storage cost may have factors for time and space. For example, the time component of the storage cost may be affected if accessing the view element from a distant location or decompressing the view element introduces a delay. Furthermore, the space component of the storage cost may be affected if compressing the view element or storing the view element on a tape medium reduces the space requirements. In general, the storage cost can represent a tradeoff between the time and space factors for storing the view elements.

The block 1320 represents the assigning of view element access frequencies to the view elements in the view element data structure. The access frequencies can be derived from an example population of view queries by keeping count of the number of times each view element is accessed in each view query. Alternatively, the access frequencies may be derived by computing the likelihood of access to each view element.

Block 1330 represents the computing of a cost for each view element to support the population of views. The cost depends on the relative processing that is required for a source view element to be used in generating an intersecting target view element. In general, two view elements intersect if they have a common decedent in the view element data structure. If two view elements do not intersect, then the relative processing cost between them is zero. Otherwise, the relative processing costs between two view elements can be computed by summing the minimum relative processing costs of generating a common decedent in the view element data structure. The support cost of each source view element can then be computed by summing the relative processing cost to generate each target view element, weighted by the view element access frequency of the target view element.

The block 1340 represents the selecting of the view elements from the view element data structure on the basis of the storage and processing support costs. There are various ways in which the selection can be achieved, the routine of FIG. 15 describes the implementation of the present embodiment in which a non-redundant and complete set of view elements is selected that minimizes the storage and processing support costs. Alternatively, block 1340 represents the selection of a static set of view elements such as those illustrated in FIG. 8.

The block 1350 represents the selecting of the view elements from the view element data in a possibly redundant fashion. Given the selection of view elements made in step 1340, additional view elements may be added in step 1350 and some view elements may be deleted from the selected set of view elements. There are various ways in which the selection can be achieved, the routine of FIG. 15 describes the implementation of the present embodiment in which a greedy algorithm adds view elements until a storage budget is reached.

Figure 14:
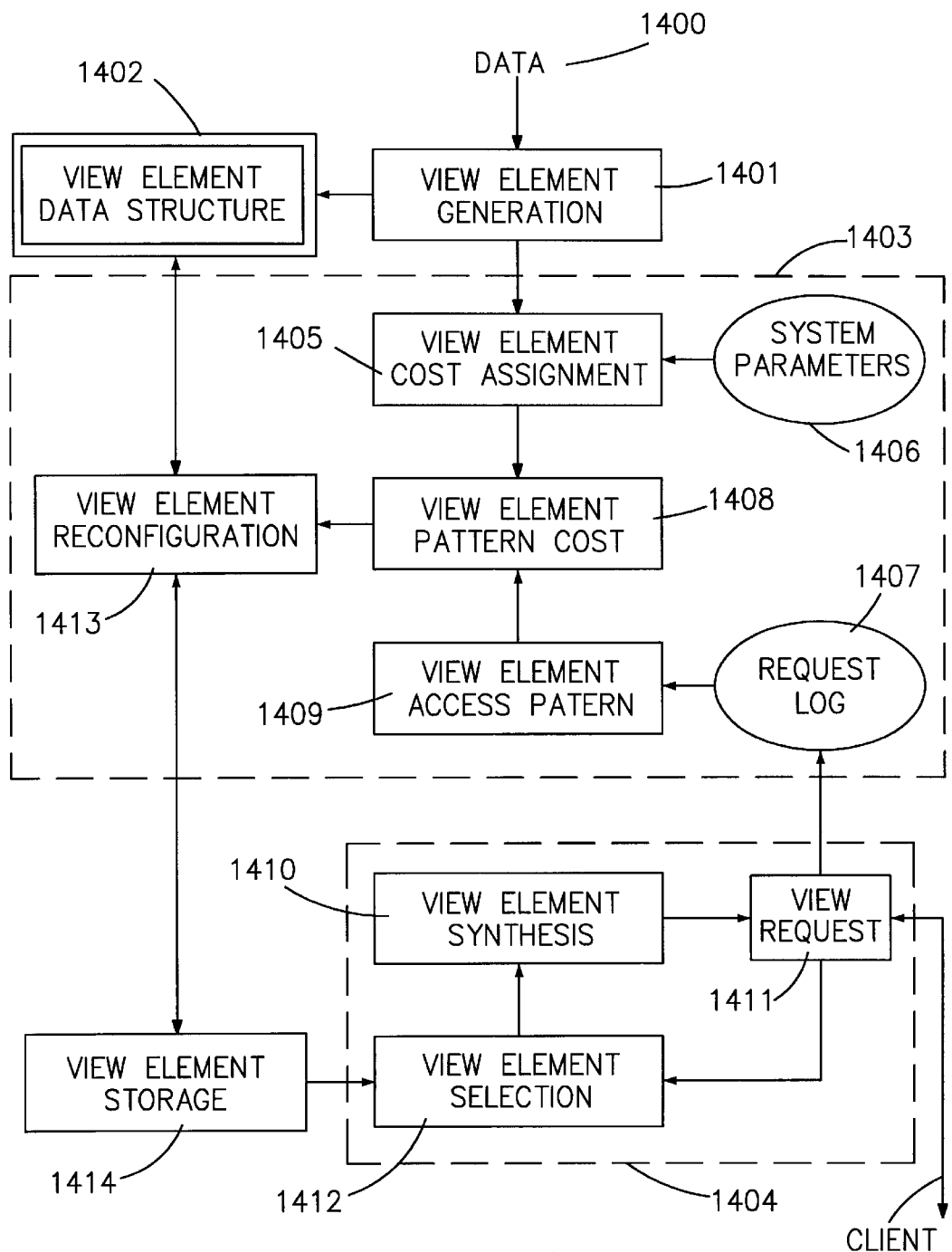
FIG. 14 illustrates a block diagram of an apparatus for dynamically reconfiguring a view element representation using the routine of FIG. 13.

FIG. 14 illustrates a block diagram of an apparatus for dynamically reconfiguring a view element representation using the routine of FIG. 13. The data 1400 is initially input into the view element generation subsystem 1401 and is ingested into the view element data structure 1402. An initial selection of view elements is made and the selected view elements are stored in view element storage 1414. The client makes requests for views to the view element retrieval subsystem 1414. Each view request is handled in step 1411 and an entry is made in a request log 1407 that records the view elements that correspond to the view. The view element retrieval subsystem 1414 is responsible for selecting view elements in step 1412 from the view element storage that are needed to construct the view requested by the client. The view elements are retrieved from storage and are processed in step 1410 to synthesize the requested view, and the view is delivered to the client.

Using the view request log, the view element reconfiguration subsystem 1403 can select the set of view elements to be stored in view element storage 1414 that is advantageous for answering the view requests typified by the entries in the view request log 1407. The view element reconfiguration subsystem 1403 implements the routine of FIG. 13 by assigning the storage and processing costs to the view elements in step 1405 and using the view request log 1407 entries to assign the view element access frequencies in step 1409. Using this information, the view element support costs are computed in step 1408, and an advantageous set of view elements is selected in step 1413. There are various ways in which the view elements can be selected in step 1413, the routines of FIG. 15 and FIG. 16 describing an implementation of the present embodiment. Once, the selection of view elements is made in step 1413, these view elements are stored in the view element storage 1414, and are used to answer subsequent view request queries.

Figure 15:
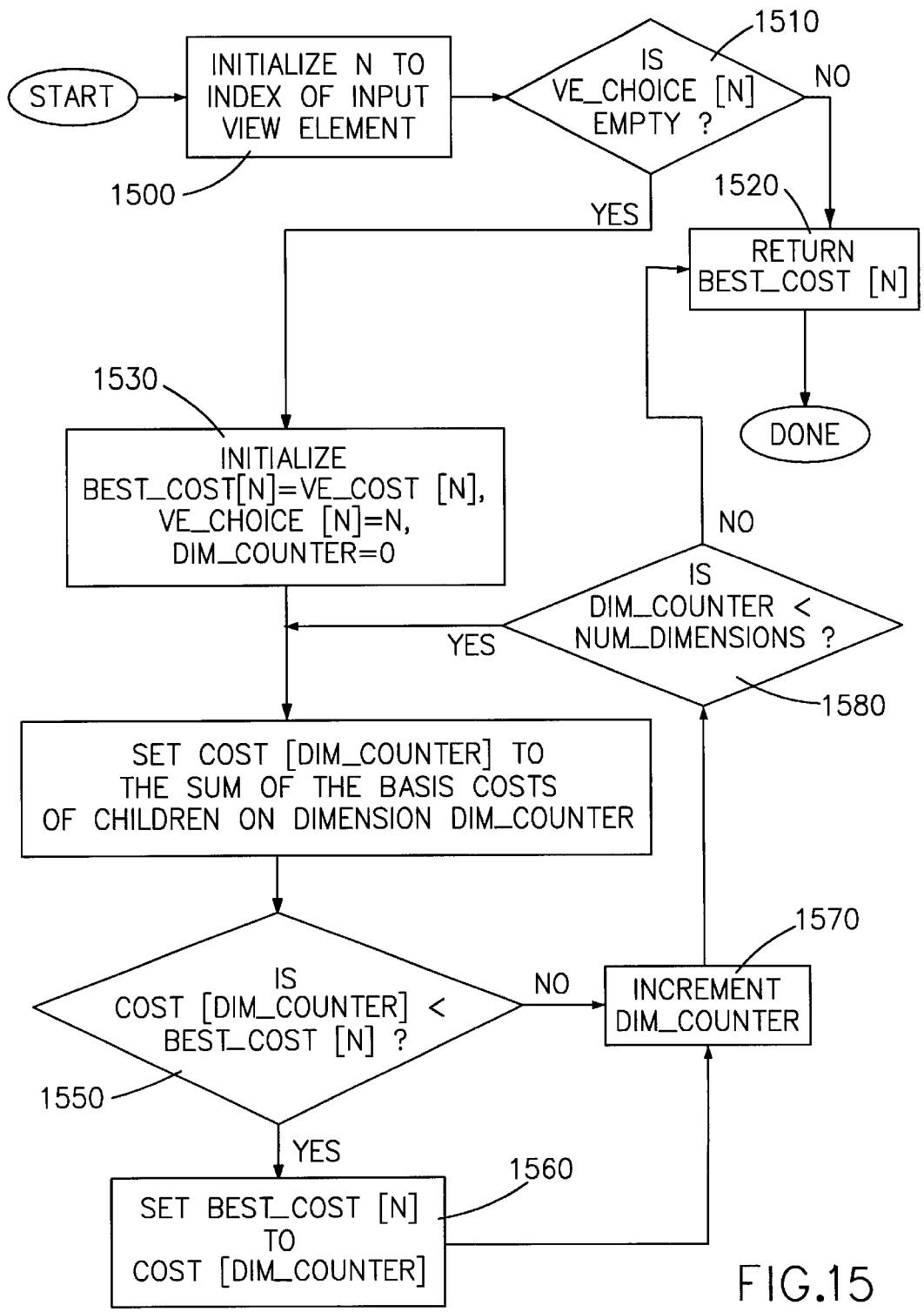
FIG. 15, there is shown a flow diagram which is suitable for implementing the view element selection process.

Referring to FIG. 15, there is shown a flow diagram which is suitable for implementing the view element selection process. The process selects a non-redundant and complete set of view elements on the basis of the view element costs. The routine operates on the view element that is input into the routine. Initially, the root node element of the view element data structure is input into this routine. For example, the root node element of the view element hierarchy data structure in FIG. 5 is denoted by $V_0$, 500. The block 1500 represents the initializing of node index N to the index of the input view element.

Inquiry is then made (diamond 1510) as to whether the input view element has previously been input into this routine and whether a choice has been made for this view element. If the choice for the input view element is not empty, then the previously computed cost for this view element is returned in step 1520 and the routine is completed. If no choice has been made, then a view element selection process is carried out for the view element. The block 1530 represents the initializing of several counters. The dimension counter for the input view element is set to zero. The choice counter for the view element with node index N is set to −1, and the best cost counter for the view element with node index N is set to the cost of the view element with node index N. That is, initially the input view element is selected in step 1530. Next, a comparison is made of the cost of this view element to the best costs of its children in order to test whether a better selection exists.

Block 1540 represents the setting of the costs of the children on the dimension of the view element denoted by the dimension counter. Block 1540 iterates the selection process by taking each of the children on the dimension and inputting them back into this routine for selecting a non-redundant basis. That is, for each child on the dimension of the view element with node index N, block 1500 is initialized with the index of the child view element. After computing the costs of the children view elements in the current dimension, inquiry is made (diamond 1550) as to whether the sum of the cost of the children view elements on the current dimension is less than the best cost of the view element with node index N. If it is, then the best cost of the view element with node index N is updated with this cost in step 1560. In block 1560 the choice for the view element with node index N is also set to the current dimensions, and the dimension counter is incremented in step 1570. If not, the dimension counter is simply updated in step 1570.

Inquiry is then made (diamond 1580) as to whether the children view elements on all of the dimensions of the view element with node index value N have been examined. The test is carried out by comparing the dimension counter to the number of dimensions of the data. If the dimension counter is less then the number of dimensions of the data, then the flow is directed back towards block 1540 to repeat the selection process on the next dimension of the data. If not, then the best-cost for the view element with node index N is returned in block 1520 and the routine is completed.

Given the choices made in the routine in FIG. 15, the view elements are selected from the view element data structure by traversing the data structure starting from the root view element and following the paths towards the children on the chosen dimensions. When a view element is reached that has a choice counter of −1, then the view element is marked as selected. After completely traversing the view element data structure in this way, the marked view elements form the selected set of view elements.

Figure 16:
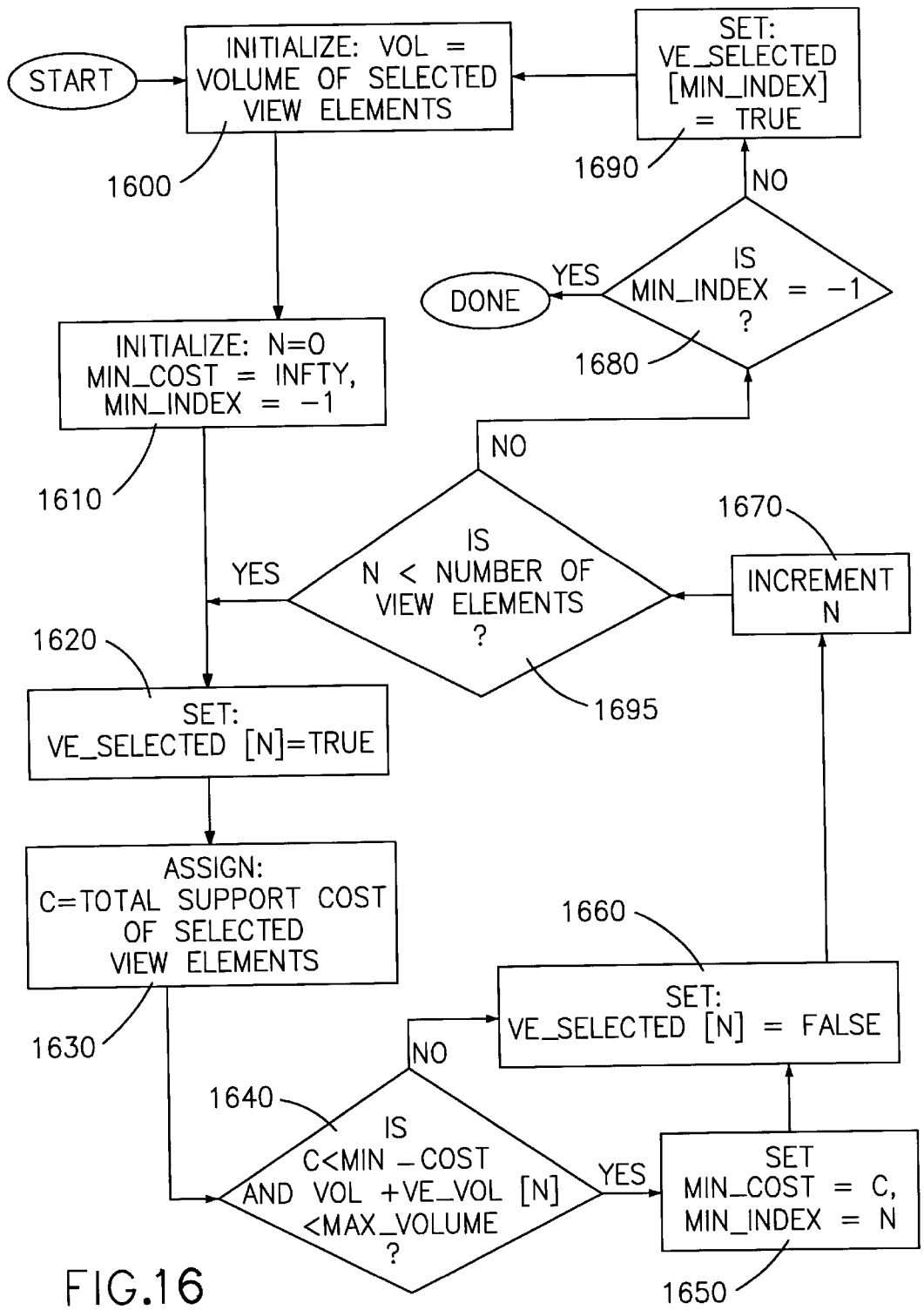
FIG. 16 provides a flow diagram which is suitable for implementing the view element selection process.

Referring to FIG. 16, there is shown a flow diagram which is suitable for implementing the view element selection process. The process selects a possibly redundant set of view elements that occupies less then a specified maximum data volume. The block 1600 represents the initializing of a counter for the total volume of the selected view elements. If no view elements are selected initially, then this counter is initialized to zero. If view elements are selected initially, then the volume counter is initialized with the sum of the volume of the data that belongs to the selected view elements. Block 1610 represents the initialization of the view element index counter N to 0, the initialization of the minimum cost to infinity and the index of the minimum costing view element to −1.

Inquiry is then made (diamond 1615) as to whether the view element with node index N is currently selected. If so, the node index counter is incremented in step 1670. If not, then the view element is selected. Block 1620 represents the setting of the selection flag for the view element with node index N to true. Block 1030 represents the computing of the total support cost of the selected view elements. This computation may involve the storage and processing costs required for the selected view elements to support a population of view requests as indicated in FIG. 13.

Inquiry is then made (diamond 1640) as to whether this costs is less than the current minimum costs, and whether the volume of this view element, when added to the total volume of the previously selected view elements does not exceed the specified maximum volume. If so, then the minimum cost is updated with this cost, and the index of the minimum costing view element is set to the current view element node index N. Block 1620 represents the setting of the selection flag for the view element with node index N to false. Block 1670 represents the incrementing of the view element node index counter.

An inquiry is made (diamond 1695) as to whether the current node index counter is less than the total number of view elements in the view element data structure. If so, then the flow is directed towards the inquiry in diamond 1615. If not, then the inquiry is made (diamond 1680) as to whether the index counter of the minimum costing view element is equal to −1. If so, then no new selection has been made and the routine is done. If not, then the selection flag of the view element with the node index given by the node index of the minimum cost view element is set to true and the routine is repeated by directing the flow back to block 1600.

Figure 17:
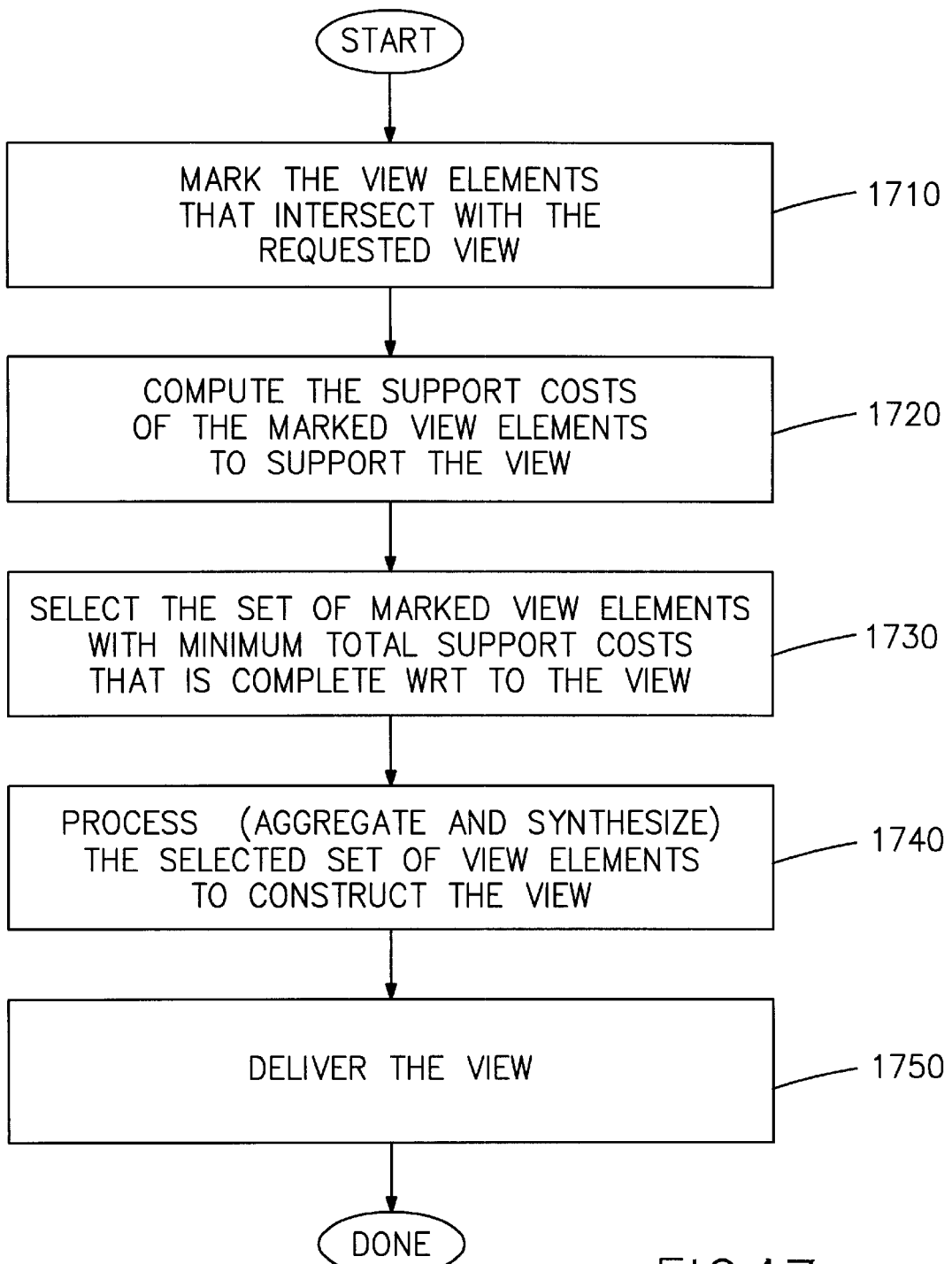
FIG. 17 illustrates a flow diagram which is suitable for implementing the view element retrieval process.

Referring to FIG. 17, there is shown a flow diagram which is suitable for implementing the view element retrieval process. The process retrieves the view elements from a stored set of view elements that are necessary for constructing a requested view, synthesizes the view from the view elements and delivers the view. Block 1710 represents the marking of the view elements that intersect with the request view. The intersection can be determined in a variety of ways. For example, if a view element has a decedent in the view element data structure that is in common with a decedent of the view, then the view element intersects with the view. Block 1720 represents the computing of the costs of the marked view elements in supporting the requested view. Block 1730 represents selection of view elements to be used for constructing the requested view. Block 1740 represents the constructing of the requested view by processing the selected view elements. Block 1750 represents the delivering of the constructed view.

What is claimed is:

1. A computerized method of generating a representation of multidimensional data using view element sets comprising the steps of:

decomposing the data into an indexed hierarchy of view elements using a view element graph by one of aggregating and segmenting multidimensional lattice data using partial aggregation and residual aggregation operator pairs;

assigning a cost and benefit of materialization to each view element;

searching through a population of candidate view element sets and evaluating the costs and benefits of each one;

selecting a view element set based on said evaluation; and storing and indexing the view elements in the selected view element set.

2. A computerized method of constructing views of multidimensional data by retrieving and assembling view elements stored for said data comprising the steps of:

identifying which view elements, in a view element hierarchy data structure generated from a multidimensional lattice by one of aggregating and segmenting the lattice data using partial aggregation and residual aggregation operator pairs, support the view;

retrieving the necessary view elements, and materializing said view from said view elements.

3. The method of claim 2 further comprising the step of further decomposing the view elements to construct the view.

4. The method of claim 2 further comprising the step of synthesizing the view elements together to construct the view.

5. A computerized method of dynamically reconfiguring a data representation comprising a stored set of view elements stored in a view element hierarchy data structure of multidimensional stored data to adapt to patterns of view access comprising the steps of:

determining the frequency of access of each view;

performing cost-benefit analysis to select a new view element set comprising view elements decomposed using partial aggregation and residual aggregation operator pairs;

comparing said stored view element set to said new view element set; and storing said new view element set in the view element hierarchy data structure when said stored view element set and said new view element set are different.

6. The method of claim 5 wherein said determining comprises estimating the likelihood of access of said view.

7. The method of claim 5 wherein previous access records are maintained and wherein said determining comprises consulting said previous access records.

8. The method of claim 5 wherein said storing of said new view element set comprises replacing only those view elements in said stored view element set which do not appear in said new view element set.

9. A computerized method of generating a representation of multidimensional data according to claim 1, wherein the view elements correspond to spatial partitions of the multidimensional data.

10. A computerized method of generating a representation of multidimensional data according to claim 1, therein the view elements correspond to aggregations and aggregation residuals of the multidimensional data.

11. A computerized method of generating a representation of multidimensional data according to claim 1, wherein the view elements correspond to a spectral partitions of the multidimensional data.

12. A computerized method of generating a representation of multidimensional data according to claim 1 wherein said view elements correspond one of the group consisting of spatial, aggregated, residual, and/or spectral decompositions of the multidimensional data and combinations thereof.

13. A system for generating a representation of multidimensional data using view element sets comprising:

decomposition means for decomposing the data into an indexed hierarchy of view elements using a view element graph by one of aggregating and segmenting multidimensional lattice data with partial aggregation and residual aggregation operator pairs;

view element cost assignment means for assigning a cost and benefit of materialization to each view element;

means for searching through a population of candidate view element sets and evaluating the costs and benefits of each one;

means for selecting a view element set based on said evaluation; and means for storing and indexing the view elements in the selected view element set.

14. A system for constructing views of multidimensional stored data by retrieving and assembling view elements stored for said data comprising:

means for identifying which view elements, in a view element hierarchy data structure generated from a multidimensional lattice by one of aggregating and segmenting the lattice data using partial aggregation and residual aggregation operator pairs, support the view;

retrieval means for retrieving the necessary view elements; and means for materializing said view from said view elements.

15. A system for dynamically reconfiguring a data representation comprising a stored set of view elements stored in a view element hierarchy data structure of multidimensional stored data decomposed using partial aggregation and residual aggregation operator pairs; to adapt to patterns of view access comprising:

means for determining the frequency of access of each view;

means for performing cost-benefit analysis to select a new view element set;

means for comparing said stored view element set to said new view element set; and storage means for storing said new view element set in the view element hierarchy data structure when said stored view element set and said new view element set are different.

* * * * *